(12) United States Patent
Mackre et al.

(10) Patent No.: US 6,510,444 B2
(45) Date of Patent: Jan. 21, 2003

(54) DATA PROCESSOR ARCHITECTURE AND INSTRUCTION FORMAT FOR INCREASED EFFICIENCY

(75) Inventors: Francois Mackre, Annecy (FR); Steven E. Bergen, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/333,903

(22) Filed: Jun. 16, 1999

(65) Prior Publication Data

US 2002/0169811 A1 Nov. 14, 2002

(51) Int. Cl.[7] ............................ G06F 17/48; G06F 17/10
(52) U.S. Cl. ....................... 708/303; 708/523; 712/221
(58) Field of Search ............................... 708/303, 523, 708/501; 712/221, 223

(56) References Cited

U.S. PATENT DOCUMENTS

| 4,323,980 | A | | 4/1982 | Houdard et al. ............. 364/724 |
|---|---|---|---|---|
| 4,766,561 | A | | 8/1988 | Thompson et al. .......... 364/724 |
| 4,881,191 | A | | 11/1989 | Morton ................... 364/724.13 |
| 5,388,062 | A | * | 2/1995 | Knutson ....................... 708/323 |
| 5,619,664 | A | * | 4/1997 | Glew .......................... 712/221 |
| 5,848,289 | A | | 12/1998 | Studor et al. ............ 395/800.32 |
| 5,892,699 | A | * | 4/1999 | Duncan et al. ............. 712/221 |
| 5,931,892 | A | * | 8/1999 | Thome et al. .............. 712/221 |
| 6,018,755 | A | * | 1/2000 | Gonikberg .................. 708/303 |
| 6,122,653 | A | * | 9/2000 | Kuroda ........................ 708/303 |
| 6,209,013 | B1 | * | 3/2001 | Gonikberg .................. 708/303 |
| 6,223,196 | B1 | * | 4/2001 | Hattori et al. .............. 708/523 |
| 6,260,136 | B1 | * | 7/2001 | Kabuo .......................... 712/221 |
| 6,286,019 | B1 | * | 9/2001 | Taylor ......................... 708/303 |

* cited by examiner

Primary Examiner—David H. Malzahn
(74) Attorney, Agent, or Firm—Susan C. Hill

(57) ABSTRACT

A processor (12) uses an architecture having a plurality of redundant state machines (86, 90) and a new instruction format (30) to increase efficiency of the utilization of operational circuitry, such as a multiply accumulate unit MAC (52). Thus the processor (12) can switch contexts or channels without incurring any dead or wasted cycles for the MAC unit (52).

19 Claims, 7 Drawing Sheets

% 00 = GO IDLE (END OF TASK LIST)
% 01 = FIR FILTER OF VARIABLE LENGTH L
% 10 = IIR FILTER
% 11 = IIR FILTER WITH SCALING ($2^n$ GAIN)

| INPUT/OUTPUT MODE 34 |||
| --- | --- | --- |
| FLOW 37 | INPUT SOURCE 38 | OUTPUT DESTINATION 39 |
| % 0 = TX (TRANSMIT)<br>% 1 = RX (RECEIVE) | % 00 = ZERO<br>% 01 = INREG<br>% 10 = HOLDREG<br>% 11 = PIPEREG | % 00 = RESERVED<br>% 01 = OUTREG<br>% 10 = HOLDREG<br>% 11 = PIPEREG |

| COEFFICIENT MEMORY MAP 40 | | | |
|---|---|---|---|
| COEFFICIENT GROUP | BLOCK NUMBER 36 | ABSOLUTE ADDRESS | COEFFICIENT |
| 0 | 0<br>1<br>2<br>...<br>15 | $00<br>$01<br>$02<br>...<br>$0F | $a4_0$<br>$a4_1$<br>$a4_2$<br>...<br>$a4_{15}$ |
| 1 | 0<br>1<br>2<br>...<br>15 | $10<br>$11<br>$12<br>...<br>$1F | $a3_0$<br>$a3_1$<br>$a3_2$<br>...<br>$a3_{15}$ |
| 2<br>... | ...<br>... | ...<br>... | ...<br>... |
| 4 | 0<br>1<br>2<br>...<br>15 | $40<br>$41<br>$42<br>...<br>$4F | $a0_0$<br>$a0_1$<br>$a0_2$<br>...<br>$a0_{15}$ |

*FIG.4*

| DATA MEMORY MAP | | | 42 |
|---|---|---|---|
| BLOCK NUMBER 36 | RELATIVE ADDRESS | ABSOLUTE ADDRESS | DATA |
| 0 | 0 | $0 | $X0_{n-4_0}$ |
|   | 1 | $01 | $X0_{n-3}$ |
|   | 2 | $02 | $X0_{n-2}$ |
|   | 3 | $03 | $X0_{n-1}$ |
| 1 | 0 | $10 | $X1_{n-4_0}$ |
|   | 1 | $11 | $X1_{n-3}$ |
|   | 2 | $12 | $X1_{n-2}$ |
|   | 3 | $13 | $X1_{n-1}$ |
| 2 | ... | ... | ... |
| – | ... | ... | ... |
| 14 | ... | ... | ... |
| 15 | 0 | $F0 | $X15_{n-4}$ |
|   | 1 | $F1 | $X15_{n-3}$ |
|   | 2 | $F2 | $X15_{n-2}$ |
|   | 3 | $F3 | $X15_{n-1}$ |

*FIG.5*

DATA PROCESSOR ARCHITECTURE AND INSTRUCTION FORMAT FOR INCREASED EFFICIENCY

FIELD OF THE INVENTION

The present invention relates to data processors, and more particularly to a data processor architecture and instruction format for increased efficiency.

BACKGROUND OF THE INVENTION

In data processing integrated circuits there is a trade-off between programmability and semiconductor area. In particular in the digital signal processing (DSP) area, a general purpose DSP processor may require a large amount of semiconductor area which is used for address generation, instruction decoding and sequencing, and data buffering. Alternatively, a hardware customized DSP may be small in semiconductor area but is usually lacking the flexibility provided by a general purpose DSP processing. A new data processor architecture and instruction format that better balances the programmability vs. semiconductor area trade-off would be valuable.

BRIEF DESCRIPTION OF THE DRAWINGS

FIG. 4 illustrates, in tabular form, a coefficient memory map 40 in accordance with one embodiment of the present invention;

FIG. 5 illustrates, in tabular form, a data memory map 42 in accordance with one embodiment of the present invention;

DETAILED DESCRIPTION

In one embodiment, integrated circuit 10 (see FIG. 1) uses a new architecture (see FIGS. 6 and 7) and a new instruction format (see FIG. 3) to implement real-time programmable DSP functions, specifically filtering functions, which were previously performed by general purpose DSP processors and/or specialized circuitry with fixed functionality. The architecture and instruction format of integrated circuit 10 offers a flexible, programmable, and easily reusable processor providing sustained peak performance of one hundred percent efficiency. Note that efficiency is being measured by the utilization of a single multiply accumulate unit (MAC). In other words, the architecture of integrated circuit 10 is able to initiate one MAC arithmetic calculation every single clock cycle while computing data on multiple independent channels. Thus in one embodiment, the architecture and instruction format of integrated circuit 10 provide a very small and compact yet high performance filter processing block. Most general purpose DSP processor implementations would require larger size, higher power consumption, and more data buffering overhead to achieve the same performance. A fully customized hardware design would lack the flexibility provided by the architecture and instruction format of integrated circuit 10. Thus in one embodiment, integrated circuit 10 is ideally suited for stand alone, in-line filtering blocks working on multiple flows (i.e. multiple channels) and/or a co-processor used to off load computationally intense filtering tasks. It is important to note that although the following description will focus primarily on one implementation of the present invention which is directed primarily towards DSP and filtering functions, the present invention may be used for any type of data processing computation and is not limited to DSP type functions. For example, the MAC unit 52 in FIG. 6 may be replaced with circuitry performing any type of circuit functions (e.g. Boolean and/or arithmetic operations). In this case, these one or more circuit functions may be all or part of an algorithm represented by bit patterns in the operation bit field 32 of the instruction format 30 (see FIG. 2). Note that the symbol "%" preceding a number indicates that the number is represented in its binary or base two form.

Figure 1:
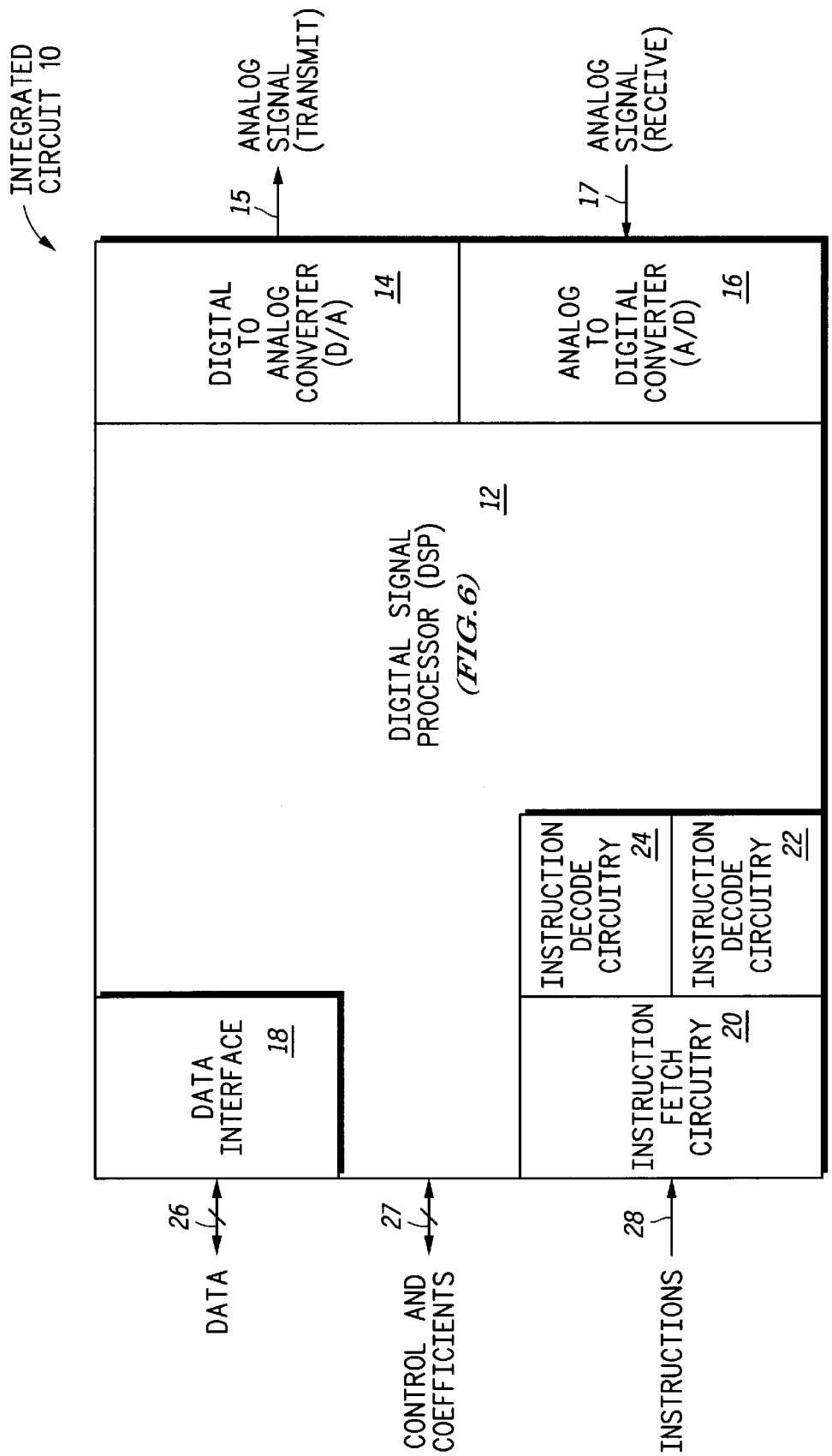
FIG. 1 illustrates, in block diagram form, an integrated circuit 10 in accordance with one embodiment of the present invention.

FIG. 1 illustrates one embodiment of integrated circuit 10. In one embodiment, integrated circuit 10 includes digital signal processor (DSP) 12, digital-to-analog converter (D/A) 14, analog-to-digital converter (A/D) 16, data interface 18, instruction fetch circuitry 20, instruction decode circuitry 22, and instruction decode circuitry 24. In one embodiment, instruction fetch circuitry 20 receives instructions from either internal instruction storage circuitry (not shown) or from external to integrated circuit 10 by way of integrated circuit terminals 28. DSP 12 receives control information and coefficients by way of integrated circuit terminals 27. Data interface circuitry 18 receives data by way of integrated circuit terminals 26. D/A converter 14 provides analog signals external to integrated circuit 10 by way of integrated circuit terminals 15. Note that the analog signals provided at integrated circuit terminals 15 may be used as the transmit portion of a communication system. A/D 16 receives analog signals by way of integrated circuit terminal 17. Note that the analog signals received at integrated circuit terminals 17 may be the received portion of a communication system.

Figures 2, 3:
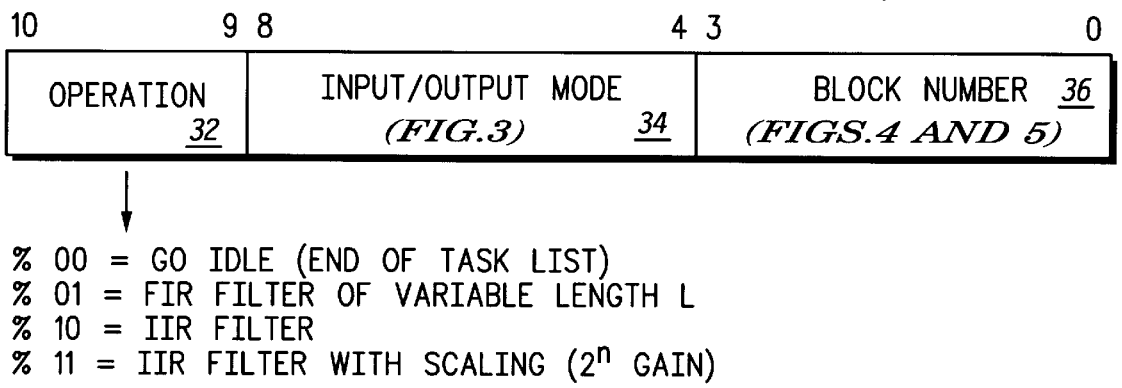
FIG. 2 illustrates, in tabular form, an instruction format 30 in accordance with one embodiment of the present invention.
FIG. 3 illustrates, in tabular form, an input/output mode 34 in accordance with one embodiment of the present invention.

FIG. 2 illustrates one embodiment of an instruction format 30 which may be utilized by the instructions received at integrated circuit terminals 28 (see FIG. 1). In one embodiment, instruction format 30 is partitioned into three bit fields, namely an operation bit field 32, an input/output mode bit field 34, and a block number bit field 36. Alternate embodiments of the present invention may use different bit fields than those illustrated in FIG. 2. In addition, alternate embodiments of the present invention may use some or all of the same bit fields but may include a different number of bits in all or some of the bit fields and may encode the bit fields differently. Bit definitions for one embodiment of the operation bit field 32 is illustrated in FIG. 2. Note that one encoding in the operation bit field 32 is used to indicate an end of the task list which causes DSP 12 to go idle. Although the illustrated embodiment of the present invention uses operation bit field 32 to select a filter algorithm, alternate embodiments of the present invention may select any type of operation, not just DSP operations. It is very important to note that although the illustrated preferred embodiment is a DSP type data processor, the present invention may be used with any type of data processor and the operation bit field 32 may be used to select any type of operation that can be performed by a data processor.

FIG. 3 illustrates one possible encoding for input/output mode bit field 34 of FIG. 2. In one embodiment input/output mode bit field 34 includes flow bits 37, input source bits 38, and output destination bits 39. In one embodiment, flow bits 37 are used to designate one of N-channels. Note that for the embodiment of the present invention illustrated herein, only two channels have been shown. However, alternate embodiments of the present invention may use any number of channels. For the embodiment of the present invention illustrated in FIG. 3, two channels are used, namely a transmit channel and a receive channel. Thus, flow bits 37 select one of those two channels. In one embodiment, input source bits 38 designate the source of the input data to be received. Bit pattern %00 specifies that the constant %0 will be used as the input data. The other bit encodings select one of the registers as the source of the input data. Note that both the flow bits 37 and the input source bits 38 may be required to select one particular register if there are multiple channels used in the embodiment. Output destination bits 39 are used to designate where the result data is stored at the end of the computation.

Figure 6:
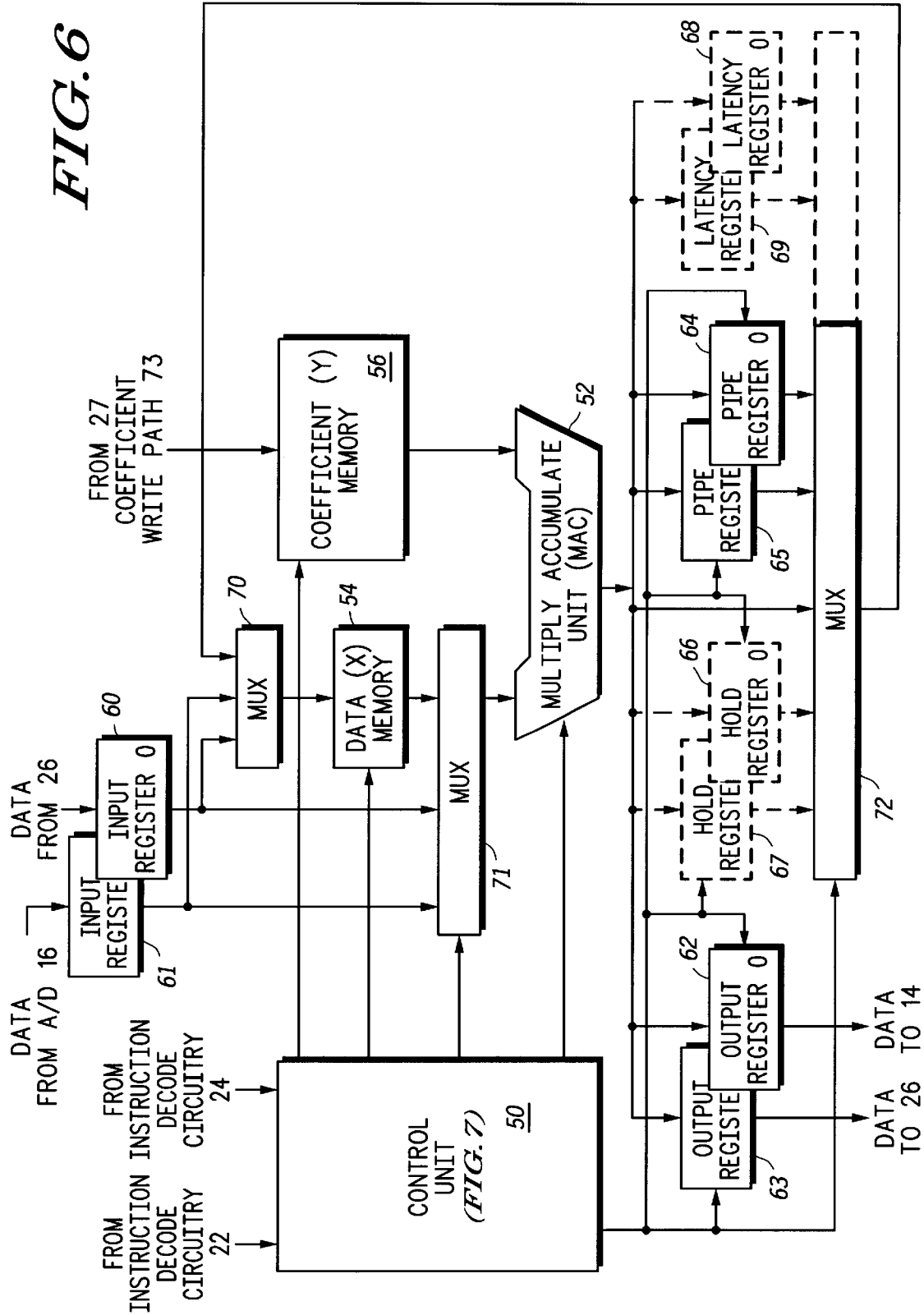
FIG. 6 illustrates, in block diagram form, a portion of digital signal processor (DSP) 12 of FIG. 1 in accordance with one embodiment of the present invention.

Referring back to FIG. 2, block number bit field 36 is used by state machines 84, 86, 88, and 90 (see FIG. 7) to determine addresses for data memory 54 and addresses for coefficient memory 56 (see FIG. 6). FIG. 4 illustrates one embodiment of a coefficient memory map 40 which may be used with coefficient memory 56 (see FIG. 6). FIG. 5 illustrates one embodiment of data memory map 42 which may be used with coefficient memory 56 (see FIG. 6). Alternate embodiments of the present invention may use a different data memory map 42 than that illustrated in FIG. 5. Note to that, the block number bit field 36 illustrated in FIG. 2 is used to determine the address for both data memory 54 and the address for coefficient memory 56 (see FIG. 6). Alternate embodiments of the present invention may separate block number bit field 36 into multiple fields, may encode the information in a different manner, or may not even require an addressing mechanism if the operation being performed does not require it.

FIG. 6 illustrates one embodiment of DSP processor 12 illustrated in FIG. 1. Note that throughout this figure, the designation 0 and 1, when used with a register, indicates whether that register is used as part of channel 0 or channel 1. Input registers 60, 61 receive data from A/D converter 16 and from data interface 18. The incoming data may then be provided to data memory 54 by way of multiplexer (MUX) 70 and to the multiply accumulate unit (MAC) 52 by way of MUX 71. Data memory 54 may also provide data to MAC 52 by way of MUX 71. Coefficient write path 73 is used to provide coefficients from integrated circuit terminals 27 to coefficient memory 56. Coefficient memory 56 is coupled to MAC unit 52 to provide coefficients. Instruction decode circuitry 22 and instruction decode circuitry 24 each provide instructions to control unit 50. Control unit 50 provides control information to data memory 54, coefficient memory 56, MUX 71, MAC 52, MUX 72, output register 62, 63, hold registers 66, 67, pipe registers 64, 65, and the optional latency registers 68, 69. The output of MAC 52 may be provided to output registers 62, 63, hold registers 66, 67, pipe registers 64, 65, optional latency registers 68, 69, and MUX 72. Hold registers 66, 67 are coupled to provide information to MUX 72. Pipe registers 64, 65 are coupled to provide information to MUX 72. The output of MUX 72 is coupled to the input of MUX 70. Output register 62 provides data to D/A converter 14. Output register 63 provide data to integrated terminals 26 by way of data interface 18.

In one embodiment of the present invention, optional hold registers 66, 67 are implemented when temporary storage is required. As an example, hold registers 66, 67 may be used to hold an intermediate result value when data interpolation is being performed (e.g. when the sample rate at integrated circuit terminals 17 is increased). Alternate embodiments of the present invention may not use optional hold registers 66, 67. Similarly, in one embodiment of the present invention, optional latency registers 68, 69 are implemented when the latency to produce a result at the output of MAC 52 is longer than the minimum number of cycles associated with any operation designated in operation bit field 32 (see FIG. 2). In such cases, optional latency registers 68, 69 may be as temporary storage in addition to or instead of the temporary storage provided by hold registers 66, 67. Alternate embodiments of the present invention may not use optional latency registers 68, 69.

Figure 7:
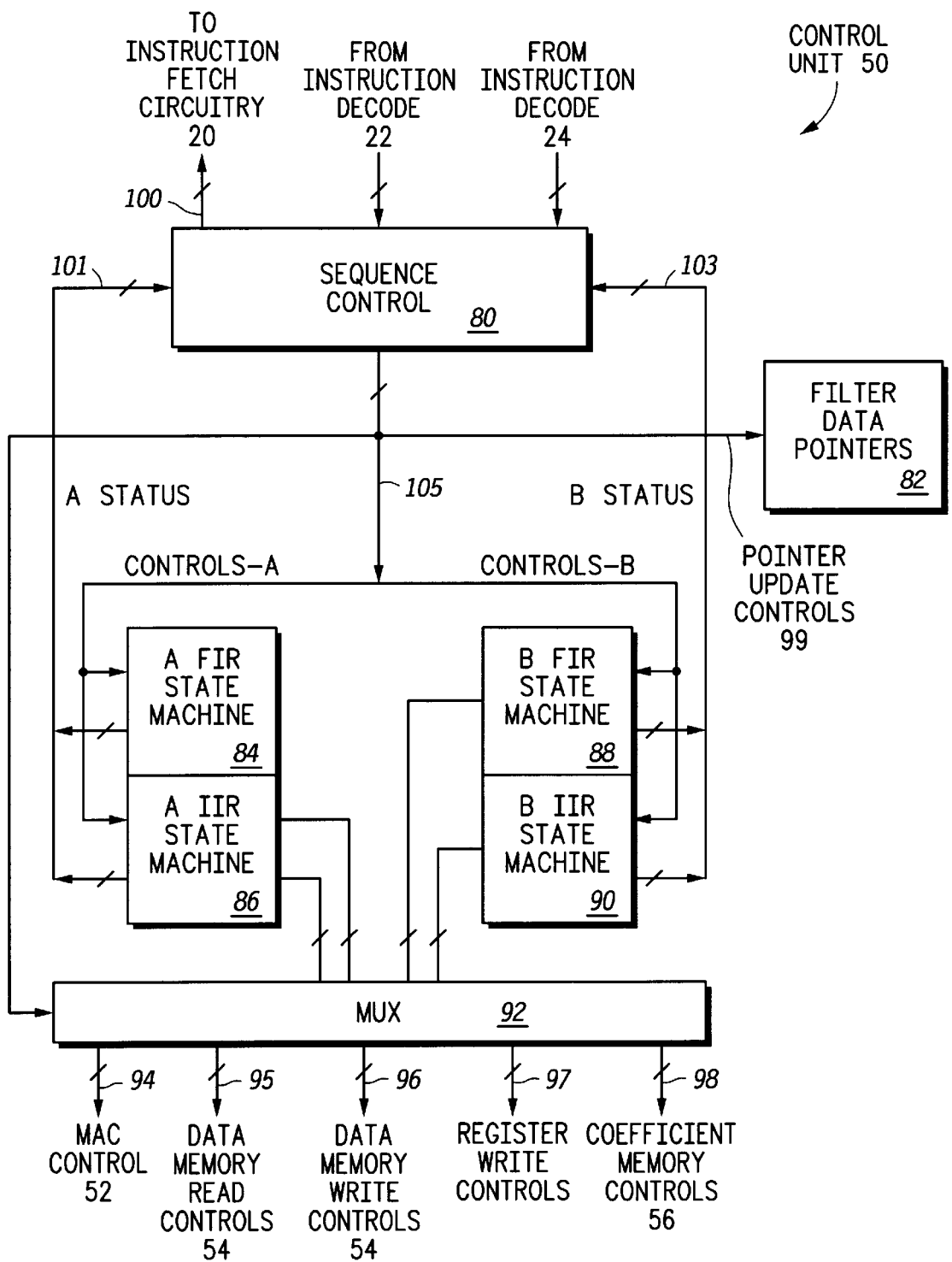
FIG. 7 illustrates, in block diagram form, a portion of control unit 50 of FIG. 6 in accordance with one embodiment of the present invention.

FIG. 7 illustrates one embodiment of control unit 50 of FIG. 6. In one embodiment, control unit 50 includes sequence control circuitry 80 which receives decoded instruction information from instruction decode circuitry 22 and instruction decode circuitry 24. Sequence control circuitry 80 provides control information to instruction fetch circuitry 20 by way of conductor 100 in order to indicate when a new instruction needs to be fetched.

Figure 8:
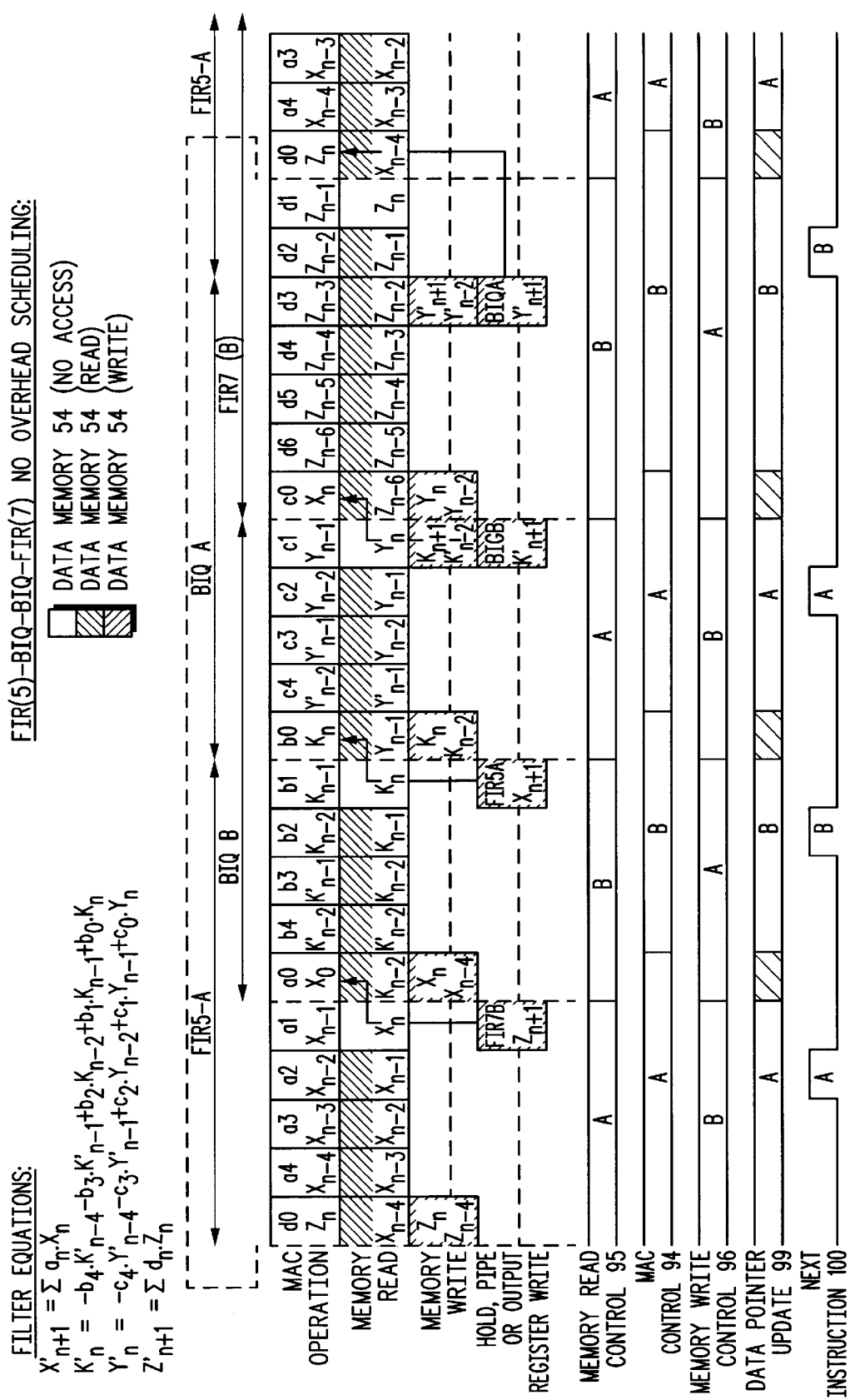
FIG. 8 illustrates, in scheduling diagram form, how the processor 12 of FIG. 1 partitions the tasks required to execute multiple filter algorithms in accordance with one embodiment of the present invention.

Still referring to FIG. 7, sequence control 80 provides control information to memory pointers 82, multiplexers (MUX) 92, state machine 84, state machine 86, state machine 88, and state machine 90. Note that in one embodiment of the present invention, memory pointers 82 contain pointer information for accessing data memory 54 and coefficient memory 56 (see FIG. 6) in conjunction with a filter operation (see operation bit field 32 in FIG. 2). In order to sustain peak efficiency while processing multiple channels and multiple filter types, each filter algorithm executed by one embodiment of DSP 12 may require overlapping execution of a plurality of duplicate state machines referenced as "A" and "B" in FIGS. 7 and 8. For example, in one embodiment of the present invention, sequential execution of two FIR filter instructions requires two duplicate state machines, namely state machine 84 and state machine 88. The sequence controller 80 grants selective control of the different operative and storage elements 52, 54, 56, 62–72 of DSP 12 to one of the two state machines "A" 84 or "B" 88 using a simple alternating pattern as illustrated in FIG. 8. Referring to FIG. 7, sequence control 80 controls the transfer of control between state machines 84, 86, 88, and 90. Sequence control 80 receives an "almost done" signal 101, 102 from the presently controlling state machine indicating that the presently controlling state machine is nearing completion of its algorithm. As a result of receiving the "almost done" signal, the sequence control 80 provides a signal 105 to the next state machine indicating that it may begin its processing. Note that in one embodiment of the present invention, the alternating pattern "A", then "B", then "A" may be time shifted to match the timing of data availability at the input and/or output of either the storage elements (e.g. memory 54, 56, registers 64–67) or the operative unit MAC 52. Alternate embodiments may use a more complex pattern than simply alternating between state machines "A" and "B". State machine 84 is capable of independently controlling the execution of DSP 12 in order to execute an FIR algorithm on a first set of data. Similarly, state machine 88 is capable of independently controlling DSP 12 in order to perform an FIR filter algorithm on a second set of data. One particular embodiment of the present invention illustrated in FIG. 7 is also capable of performing sequential execution of an IIR filter algorithms on multiple sets of data or on multiple channels where the data is either dependent or independent. Again, two duplicate state machines, namely state machine 86 and state machine 90, overlap their processing in order to implement sequential IIR filter algorithms within DSP 12.

The reason that two separate duplicate state machines are required for each filter algorithm is because DSP 12 is capable of overlapping the processing of two separate algorithms. And if these two separate filter algorithm are both IIR filter algorithms, then two separate state machines, namely state machines 86 and 90, are required to separately control these two separate IIR functions. By interleaving two separate algorithms, the present invention allows DSP 12 to continuously utilize MAC 52. As a result one hundred percent efficiency or utilization of MAC 52 is attainable with no overhead required to transition between different sets of data or between different filter algorithms.

Still referring to FIG. 7, memory pointers 82 provide memory pointer information to state machines 84, 86, 88, and 90. State machines 84, 86, 88, and 90 provide status information back to sequence control circuitry 80. State machines 84, 86, 88, and 90 provide control information to MUX circuitry 92. MUX circuitry 92 provides MAC control signals to MAC 52 by way of conductors 94. MUX circuitry 92 provides data memory control signals to data memory 54 by way of conductors 95. MUX circuitry 92 provides data memory write control signals to data memory 54 by way of conductors 96. MUX circuitry 92 provides register write control signals to registers 62–69 by way of conductors 97. MUX circuitry 92 provides coefficient memory control signals to coefficient memory 56 by way of conductors 98.

FIG. 8 illustrates an example of the operation of DSP 12. In the particular example illustrated in FIG. 8, DSP 12 performs an FIR filter algorithm of length 5 on a first set of data, where five MAC 52 operations utilizing five separate coefficient values are required (X filter equation). The second task of DSP 12 is to perform a bi-quad IIR filter algorithm on a second set of data (filter equation K') where five MAC 52 operations utilizing five separate coefficient values are required. The third task for DSP 12 is to perform another bi-quad IIR filter algorithm using a different set of data, namely a third set of data (filter equation Y'). The fourth task for DSP 12 is to perform an FIR filter algorithm of length 7 where seven MAC 52 operations using seven coefficient values are required on a fourth set of data (filter equation Z). Note that in one embodiment of the present invention, the first, second, third, and fourth sets of data may belong, without restrictions, to any channel of an N-channel processing system. The row or horizontal line of boxes labeled "MAC operation" indicates which instruction is utilizing MAC 52. The line labeled "memory read" indicates which instruction is performing a read operation to data memory 54. The line labeled "memory write" indicates which instruction is performing a write operation to data memory 54. The line labeled "hold, pipe, or output register write" indicates which instruction is performing a write to the hold, pipe, or output registers 62–67 from MAC 52. The bottom portion of FIG. 8 illustrates which state machine 84, 86, 88, 90 (see FIG. 7) is used to control the designated signal. The use of multiple state machines which are capable of controlling execution of the same function allows the operational circuitry, in this case MAC 52, to be used at one hundred percent efficiency by switching control of the operational circuitry back and forth between a plurality of overlapping state machines (e.g. state machines "A" and "B"). Although the particular embodiment of the present invention illustrated in FIG. 7 uses two state machines per function, alternate embodiments of the present invention may use any number of state machines per function. Also, alternate embodiments of the present invention may use any type of redundant control circuitry for controlling the same operation.

Duplicate state machines (e.g. 84, 88) are just one possible type of control circuitry. Alternate embodiments of the present invention may use duplicate microcode memories, duplicate random logic, or may use any other type of duplicate circuitry for control purposes. However, duplicate state machines (e.g. 84, 88) may use a very small amount of semiconductor area on integrated circuit 10 and may have the advantage of being a very straightforward implementation. Note also that alternate embodiments of the present invention may have operational circuitry that is capable of performing any number of functions. Alternately, the operational circuitry may be partitioned so that different portions of the operational circuitry participate in different functions.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the spirit and scope of this invention.

We claim:

1. A method for efficiently processing digital signals using multiple filter functions on multiple channels comprising the steps of:

receiving and decoding a first instruction of a plurality of instructions, said first instruction specifying a first filter function to be applied to data associated with a first channel;

activating a first state machine in response to said first instruction to perform said first filter function by activating an arithmetic unit a first plurality of times;

receiving and decoding a second instruction of said plurality of instructions prior to a completion of said first instruction, said second instruction specifying a second filter function to be applied to data associated with a second channel; and activating a second state machine in response to said second instruction to perform said second filter function by activating said arithmetic unit a second plurality of times immediately after said first state machine no longer requires the use of said arithmetic unit but prior to a completion of said first filter function by said first state machine.

2. The method of claim 1 further comprising the steps of:

storing a result of said first instruction in a temporary register; and using said temporary register as a source of data for a subsequent instruction.

3. The method of claim 1 wherein the step of receiving and decoding said first instruction comprises the step of receiving and decoding a finite impulse response (FIR) filter.

4. The method of claim 1 wherein the step of receiving and decoding said first instruction comprises the step of receiving and decoding an infinite impulse response (IIR) filter.

5. The method of claim 1 wherein the step of activating said first state machine further comprises the step of activating a single multiply and accumulate unit said first plurality of times.

6. In a data processor comprising:

an instruction fetch circuit having an input for receiving an instruction of a plurality of instructions, and an output, said instruction including an operation code field, a source field, and a destination field; and an execution unit having a data input for receiving an input data operand as determined by said source field, a data output for providing an output data operand as determined by said destination field, and a control input for receiving said operation code field, wherein said execution unit processes said input data operand to provide said output data operand selectively as determined by said operation code field, the execution unit including an input register and an output register which are adapted to be coupled to external devices and which are selected by said source field and said destination field, respectively, the improvement wherein:

each of said plurality of instructions utilizes a single arithmetic unit a plurality of times;

said execution unit further comprises a temporary register that is separate from said input and output registers and that is inaccessible by external devices;

said source field specifies one of said input register and said temporary register; and said destination field specifies one of said temporary register and said output register, whereby a sequence of a first one of said plurality of instructions that specifies said temporary register in said destination field and a second one of said plurality of instructions that specifies said temporary register in said source field allows consecutive instructions to utilize said single arithmetic unit efficiently, and whereby the second one of said plurality of instructions is never stalled because of having a data dependence on the first one of said plurality of instructions.

7. The data processor of claim 6 wherein said plurality of instructions includes an infinite impulse response (IIR) filter and a finite impulse response (FIR) filter.

8. A data processor comprising:

a sequence controller having an input for receiving an instruction of a plurality of instructions, and an output;

an arithmetic unit; and first and second state machines each having an input coupled to said output of said sequence controller, and an output coupled to said arithmetic unit, for controlling an execution of first and second instructions, respectively, using said arithmetic unit, said sequence controller activating said first state machine in response to receiving said first instruction, said sequence controller activating said second state machine in response to receiving said second instruction prior to a completion of said first instruction, whereby said second state machine begins an execution of said second instruction prior to a completion of said first instruction by said first state machine.

9. The data processor of claim 8 wherein said arithmetic unit performs a multiply-and-accumulate (MAC) operation.

10. The data processor of claim 9 wherein said first state machine performs a plurality of MAC operations using said arithmetic unit in response to said first instruction.

11. The data processor of claim 8 wherein:

said arithmetic unit includes a pipeline;

said first state machine signals an intermediate state of completion of said first instruction to said sequence controller; and said sequence controller uses said intermediate state of completion to signal an availability of said arithmetic unit to said second state machine.

12. The data processor of claim 8 wherein:

said first state machine signals an intermediate state of completion of said first instruction to said sequence controller; and said sequence controller uses said intermediate state of completion to initiate a fetch of a third instruction.

13. The data processor of claim 8 wherein:

said first state machine signals an intermediate state of completion of said first instruction to said sequence controller; and said sequence controller uses said intermediate state of completion to update one a plurality of memory pointers.

14. The data processor of claim 8 wherein said first state machine controls said arithmetic unit to perform an infinite impulse response (IIR) filter function.

15. The data processor of claim 8 wherein said first state machine controls said arithmetic unit to perform a finite impulse response (FIR) filter function.

16. The data processor of claim 8 wherein said first state machine controls said arithmetic unit to perform a predetermined algorithm other than a digital filter function.

17. The data processor of claim 8 further comprising third and fourth state machines each having an input coupled to said output of said sequence controller, wherein said sequence controller further activates a selected one of said first and third state machines in response to receiving said first instruction, and activates a selected one of said second and fourth state machines in response to receiving said second instruction.

18. The data processor of claim 17 wherein said first instruction is associated with a first communication channel, and said second instruction is associated with a second communication channel.

19. The data processor of claim 18 wherein both said first state machine and said second state machine implement a first filter function, and both said third state machine and said fourth state machine implement a second filter function.

* * * * *